Figure 4:
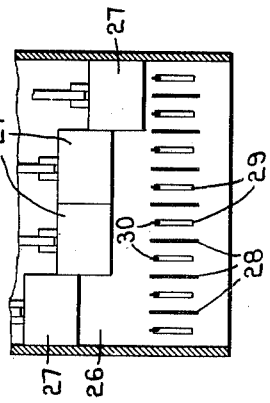

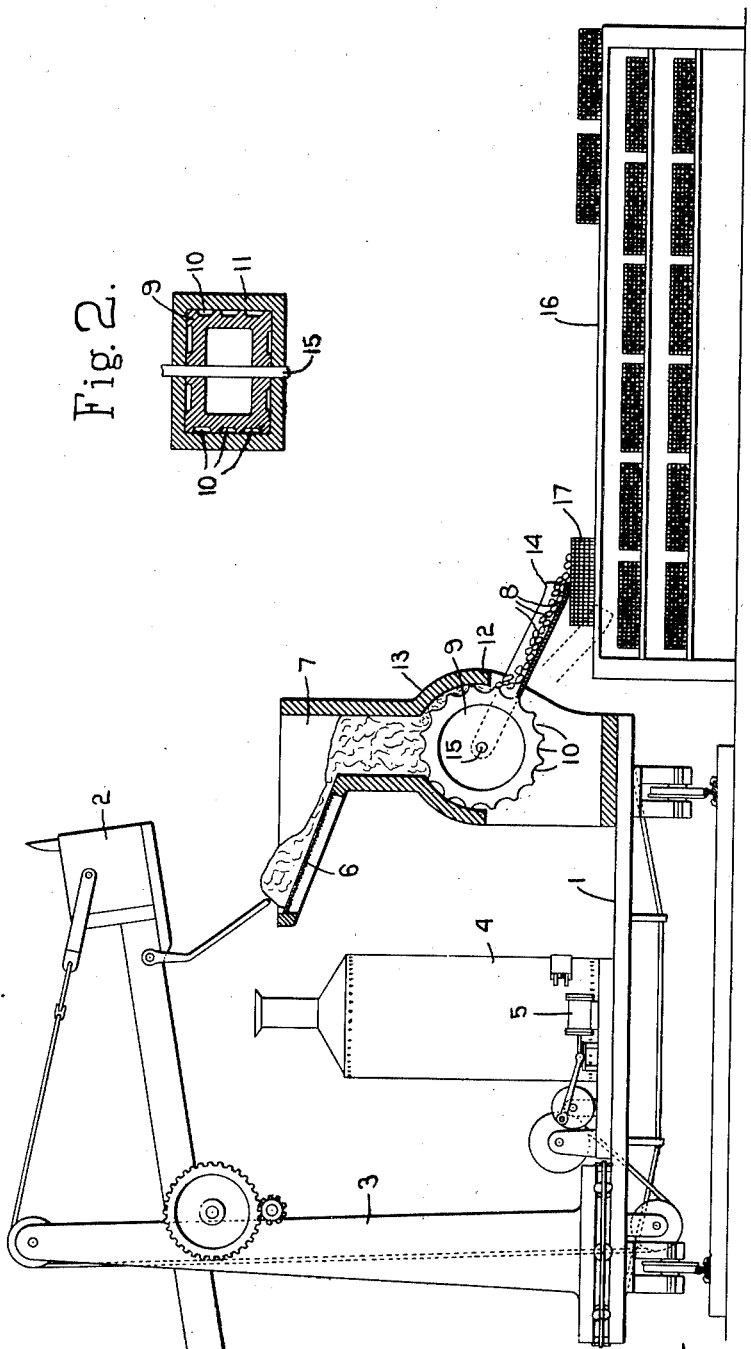

W. W. BLAIR.
METHOD OF TREATING PEAT.
APPLICATION FILED JUNE 20, 1918.

1,349,713.

Patented Aug. 17, 1920.
3 SHEETS—SHEET 2.

Inventor.
Wesley W. Blair
by Heard Smith & Tennant.
Attys.

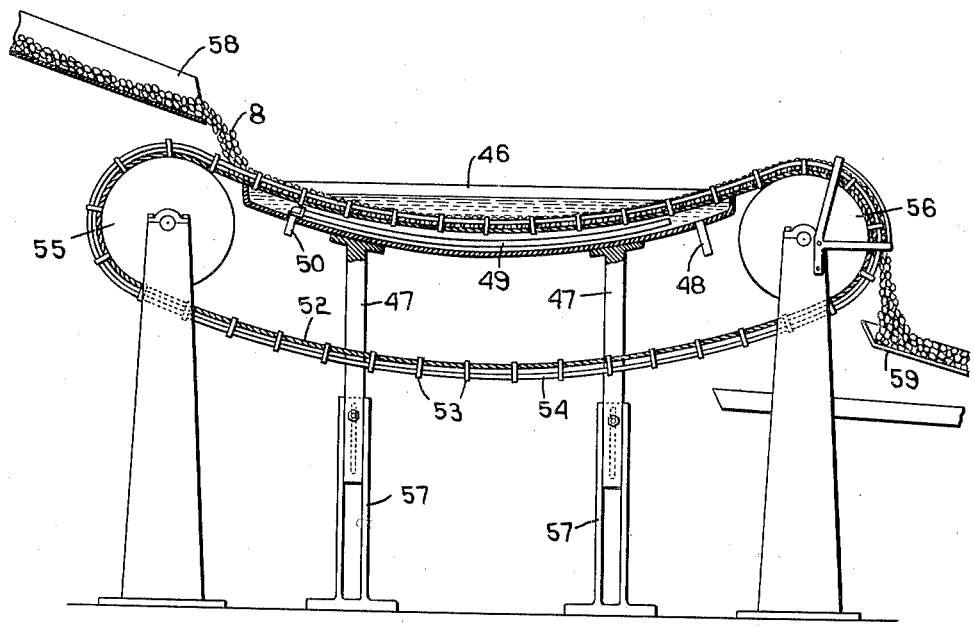

UNITED STATES PATENT OFFICE.

WESLEY W. BLAIR, OF NEWTONVILLE, MASSACHUSETTS.

METHOD OF TREATING PEAT.

1,349,713.          Specification of Letters Patent.      Patented Aug. 17, 1920.

Application filed June 20, 1918. Serial No. 240,888.

*To all whom it may concern:*

Be it known that I, WESLEY W. BLAIR, a citizen of the United States, and resident of Newtonville, county of Middlesex, State of Massachusetts, have invented an Improvement in Methods of Treating Peat, of which the following description, in connection with the accompanying drawing, is a specification, like characters on the drawing representing like parts.

This invention relates to improvements in processes for treating peat for fuel purposes and is a continuation in part of my prior application No. 137,027, filed December 14, 1916, and allowed August 27, 1917.

In the prior application aforesaid my process is described particularly with reference to the treatment of peat as it is taken from the bog without maceration and in the prior application certain disadvantages of having the peat macerated or ground is set forth.

In further investigation and developments of processes of treating peat I have found that my process may be used very advantageously with the introduction of the additional step of macerating the material and the present application is intended to include both the process described and claimed in my original application aforesaid and the process as including the additional step of maceration which will hereinafter be more fully explained.

Freshly dug or wet peat has a relatively small heating value due to its high percentage of water content—about 85 to 90 per cent. This content may be reduced below 70 per cent. by pressure or to atmospheric moisture by air-drying. Peat which is simply cut and dried is in a loosely aggregated mass and disintegrates during handling and combustion and its calorific value is low.

At present, there are two general processes of treating peat to increase its availability as a fuel. One results in the production of machine peat and the other in compressed briquets. Machine peat, as the name is commonly understood, is made by grinding and macerating the peat with about the same amount of moisture that it contains in the bog and thereafter cutting it into bricks as it issues from the outlet of the grinding machine in a thoroughly macerated condition but sufficiently stiff to retain its form. Machine peat is only very slightly compressed yet its thermal efficiency is higher than that of the cut peat and its more firm state permits of greater facility of handling, transportation and storage. Compacting peat increases its efficiency and lasting qualities as a fuel and makes it more easily transportable and storable, hence, the more expensive briqueting process.

Briquet peat is made by drying the peat as taken from the bog until the water content is reduced to about 40 per cent. The peat is then powdered and dried artificially to about 15 per cent. moisture. It is then formed into blocks by enormous pressure in a briqueting machine or press. The cost of production of briquet peat is at least one-third greater than that of machine peat, whereas, the heating value is increased only about 15 per cent. The advantage of briqueting is that the number of heat units is increased per unit of volume. It can therefore be transported and stored in smaller spaces and burned in smaller fireboxes. Furthermore, briquets burn less rapidly than machine peat and, hence, give less trouble in firing for power purposes. However, peat in briquet form, even more than the machine form, is friable, liable to crack and crumble when handled and to break down in the combustion chamber into a powder and thus blanket the fire.

It is this liability and tendency to disintegration of the present peat forms which is overcome in this novel invention coincidently with the increase in the calorific value of the peat.

In this improved process, the fuel value of the prepared peat is raised by the treating of the peat with a low grade oil. The steps preliminary to the oil-treating are such that the peat is so presented that it may readily absorb the oil and yet preserve its hard, firm structure.

This is achieved by blocking the freshly dug peat in its wet state either as it comes from the bog without maceration or after a predetermined degree of maceration which breaks down the cellular structure and releases the pitchy substance of the peat so that it forms a natural bond for the material of the block and also releases the water and thereby facilitates the drying of the block. The blocks after having been formed are then air-dried in open racks or artificially dried by any suitable means such as will hereinafter be described. The blocks resulting from this treatment are hard, firm and dry and retain their absorbent quality.

While the blocks thus treated are prepared for the next step in the process they may be conveniently handled, transported and stored. The final step in the process comprises the impregnation of the blocks with a fuel oil. For this process any low grade fuel oil may be employed, the impregnation preferably being effected about the time of use.

The principal object of this invention therefore is, to provide a process which will increase the value and availability of peat as a fuel.

The accompanying drawings illustrate certain preferred forms of apparatus which may be conveniently employed to carry out the objects of the invention. It will however, be understood that the invention is not confined to the exact features shown and described and that various changes may be made or other apparatus employed within the reasonable scope of my invention as defined by the following claims.

Figure 3:
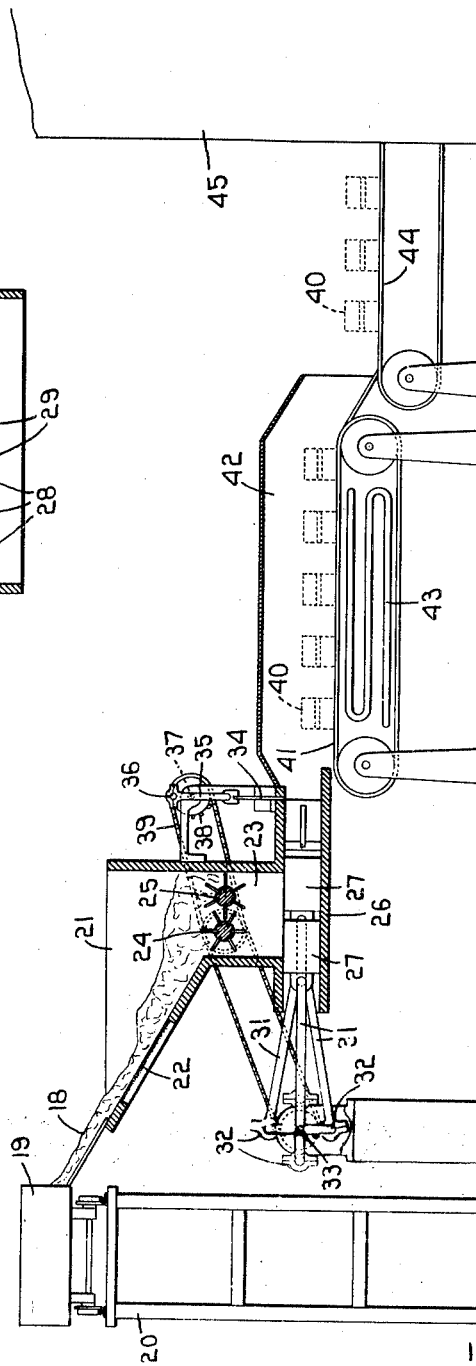

In the drawings,

Figure 1 is a side elevation partly in section of a digging and blocking machine showing the peat being treated together with drying racks for the blocked peat, Fig. 2 is a vertical section through the blocking drum and the adjacent chamber walls, Fig. 3 is a side elevation partly in section of a different form of peat treating and blocking machine illustrating drying mechanism adapted to be used in connection therewith, Fig. 4 is a horizontal sectional view showing in plan the blocking mechanism, and, Fig. 5 is a side elevation partly in section of an apparatus for treating the blocked peat with suitable fuel oil.

This novel process, broadly considered, comprises the formation of peat blocks either directly from the freshly dug peat or the formation of the blocks from peat which has been dug and suitably macerated, the drying of the formed blocks either by air or by artificial heating and finally the impregnation of the dried blocks with a fuel oil. Certain forms of apparatus adapted to carry out the complete process are disclosed in the accompanying drawings. The digging and blocking may be accomplished by separate mechanisms. As illustrated in Fig. 1 of the drawings however, one piece of machinery is provided to effect the digging, the conveying to the blocking machine, the blocking, and the delivery to the drying racks while in Fig. 3 an apparatus is shown in which the peat is discharged from suitable cars, in which it is transported from the bog, into the hopper of a blocking machine. The blocks which are delivered from the blocking machine are carried over an artificial heating means and finally delivered to a suitable store-house or to the mechanism for treating the same with fuel oil as will hereinafter be described.

As illustrated in Fig. 1 the digging and blocking machine is movably mounted as on a flat car 1 running on a wide gage track. Obviously other transportation means may be employed or the appliance may be stationary and adaptable to be removed and set up in another portion of the bog.

A shovel 2 is mounted on a standard 3 in the usual manner and is actuated by means of a power unit. This unit may be of any convenient type and is here shown as a steam boiler 4 and engine 5. This apparatus functions to excavate or dig the peat from the bog and deposit the same upon a screen 6 which preferably forms part of the hopper of the blocking device.

This screen is preferably carried by the upper portion of the blocking device and functions not only to permit surplus water to drain but affords opportunity for the removal or picking of branches, roots, logs or similar undesirable substances. The peat mass when upon the screen may also be agitated to facilitate the removal of such articles. Such substances may be directly utilized as fuel.

This blocking apparatus comprises an inclosed chamber or chute 7, leading from the screen 6 to the movable member by which the next step in the process is effected. This is the blocking step in which the peat mass is formed into separate, preferably rounded, blocks 8. Such movable member is disclosed herein as a revoluble drum 9 having a plurality of alined depressions in its circumference. These depressions or molds 10 receive the peat mass which slides from the screen 6 down the chute 7. This drum is actuated by any suitable power means which need not be shown, although, obviously, the power may be conveniently derived from the same power unit as that which actuates the digging device. The peat is forced, by the weight of the superposed mass, into the molds 10 as the drum revolves—as here disclosed, in a clock-wise direction. The side 11 (see Fig. 2) of the blocking chamber functions to coöperate with the drum to compress the peat in the molds. This compression is not great enough to force out a large amount of water but does serve to form the peat into blocks. The curvature of the inside face of the side 11 is eccentric with relation to the curvature of the drum periphery. This eccentricity is such that the lower portion 12 of this inside face is in closer proximity to the drum than is the upper portion 13—hence, the peat mass in a given mold is increasingly constricted and compressed by the revolution of the driven drum. The molds 10 are so designed as to cause the formed blocks to present rounded edges. This is to obviate the crumbling and chipping tendency of sharp corners and edges as the blocks are handled in transportation and storage or in transference to the combustion chamber.

The next step in the process is to reduce the water content of the formed block. The block at this stage of the process retains the major portion of its original moisture of the bog. This reduction is preferably achieved by drying in the open air which will reduce the water content to that of the surrounding atmosphere. The peat may also be dried by any suitable artificial means such for example as by passing the peat over or through a heating apparatus which is adapted to dry out and evaporate the moisture contained in it.

When the air drying process is used the blocks may be transferred from the blocking machine and dried upon the ground, but they are preferably placed upon racks which permit them to give up their water content more rapidly and require less area. As illustrated herein a slide or chute 14 is mounted upon the shaft 15 of the drum 9 and guides the blocks 8 which drop from the molds of the revolving drum into the drying apparatus. The slide is shown as pivotally mounted so that it may assume a plurality of positions, such as that partially shown in dotted lines in Fig. 1. The blocks may thus be directed to any tier in the drying rack which as disclosed herein comprises a three tier rack or table 16. The blocks are dropped from the blocking machine into a receptacle 17 having bent sides and base, preferably formed of wire mesh, such construction and receptacles affording a ready circulation of air about the blocks. These blocks dry in a firm hard state without the crumbling and disintegrating tendencies of briqueted peat.

The blocks thus formed are of such cellular structure as to be capable of absorbing a relatively large quantity of oil. When in this state the blocks may immediately be treated with the oil or transferred to a place of storage or to the point at which they are destined to be employed as a fuel, where the next or oil step may be carried out.

In Figs. 3 and 4 of the drawing a different form of apparatus for performing my process is illustrated. The peat 18 is delivered from a car 19, which is run upon a suitable trestle 20, to the hopper 21 of the blocking machine. This hopper may be and preferably is provided with a screen 22 similar in character to the screen above described which is adapted to let the surplus of water drain away from the peat and also to afford a packing table. The hopper 21 preferably has a vertical magazine or portion 23 in which macerating devices such as interengaging winged or toothed rollers 24, 25 are employed and which serve to break up the peat to a certain extent but not to disintegrate. The peat passing through the chamber 23 falls upon a table 26 from which it is compressed and cut into blocks by a series of reciprocating plungers 27 which force the peat through suitable vertical cutters which form it into blocks of a convenient size. These cutters, as illustrated herein desirably are in the form of vertical cutting places 28 of sufficient thickness to sever the peat longitudinally as it is forced against them by the plungers 27. The cutting plates 28 may be spaced at any desired distance apart according to the size of the block which is desired.

In certain instances it is desirable to provide the blocks with apertures to afford access to the interior of the blocks and thereby to facilitate their absorption of the fuel oil. In order to provide blocks with such apertures a series of cores 29 may be supported upon suitable thin blades 30, the cores 29 preferably being midway of the vertical height of said plates. By thus supporting the cores upon very thin blades the apertures formed by the cores will remain in the blocks while the portions of the blocks which have been severed by the thin plates 30 will readily adhere together by reason of the pressure upon the sides of the blocks by the vertical cutting plates 30. The plungers 27 may be reciprocated in any suitable manner. As illustrated herein four plungers 27 are employed being connected respectively by pitmen 31 to the cranks 32 of a suitably driven crank shaft 33 said cranks being set at angles of ninety degrees relatively to one another so that substantially a constant amount of power is utilized.

As the peat is forced through the cutting blades 30 it is formed into continuous bands which are severed by a suitable vertically reciprocating knife 34 which is actuated through a pitman 35 from a crank 36 upon a shaft 37 which may be driven by a sprocket wheel 38 and chain mechanism 39 from the shaft 33. The blocks 40 from the blocking machine may be delivered to an air drying mechanism such as that illustrated in Fig. 1 but preferably are delivered to an automatic drying mechanism such for example as an endless conveyer 41 located within a hooded chamber 42 heat being supplied to the same in any suitable manner such for example as by coils of steam pipes 43 located between the upper and lower leads of the endless conveyer.

As illustrated in Fig. 3 the blocks when dried in the manner aforesaid are discharged upon an endless conveyer 44 by which they may be carried directly to the oil treating mechanism or transported to a storage chamber or warehouse 45.

The final step in the process consists in treating the peat with a suitable fuel oil. The oil employed may be a relatively cheap, low grade fuel oil. If too viscous, it may be thinned by heating. The blocks may be caused to absorb the oil by any suitable means and the apparatus disclosed in Fig. 5 has proved a convenient mode of its accomplishment. Broadly, it consists of an endless conveyer running through an oil bath. An oil trough 46 is mounted upon standards 47. An oil supply intake 48 is provided for the replenishment of the oil. A heating pipe 49, preferably a steam-pipe, is positioned in the base of the trough and is provided with a connection 50 to the steam supply. The trough is longitudinally curved and is provided with flanges or short sides. The conveyer, in this embodiment, is of the endless belt type. The base may be of any suitably flexible, preferably reticulated material, such as a wire mesh belting. An endless metallic cable 52 is secured to each side of the mesh belting and to each of these cables is secured a plurality of short posts 53. These posts carry endless wires 54 which serve as a side of the conveyer. The two sides function to retain the dry blocks 8 upon the base as the conveyer travels through the oil trough 46. The conveyer is carried by the drums 55 and 56 and is preferably actuated by the drum 55 which moves in a clock-wise direction. This permits the upper run of the conveyer to sag and thus, under weight of the received blocks, to travel with the conveyed blocks immersed in the oil in the curved trough. The trough is so mounted as to be vertically adjustable and to this end, the standards 47 are each adjustably supported by the uprights 57. Such adjustment of the oil trough permits of change of the immersion depth of the conveyer as desired. In carrying out this step, the blocks, when suitably dry, are removed from their receptacle or from the place of storage and deposited in the chute 58 whence they downwardly slide and may be continuously fed upon the traveling conveyer, as shown in Fig. 3. Emerging from the trough, the oil soaked blocks are dropped by the conveyer as it passes over the drum 56 upon another chute 59 from which they are removed for use, sale, storage or other purpose.

The wet peat mass is thus converted into firm, hard blocks with rounded edges, and impregnated with a fuel oil. The oil functions in no sense as a binder, rather it may be conceived that the absorbent peat block functions as a wick for the oil.

By the avoidance of the preliminary drying and the pulverizing steps in the briqueting process, the crumbling tendency and the friable nature of the peat briquet is obviated. Peat treated by this novel process has a high calorific value and the blocks are firm, hard and of such nature that they may be successfully coked. They may be transported, stored and handled with great convenience and small losses and in the combustion chamber they burn uniformly, steadily and continuously and with a very slight ash residue. During combustion, these blocks do not disintegrate and clog the fire but burn with a long uniform flame, with intense heat.

While this blocking process is preferred it may be noted that the peat as cut from the bog and then air-dried may be impregnated with such heavy fuel oil. Peat so treated does not have the hardness and tenacity of the block peat, and is therefore not economically transportable but may be used advantageously adjacent the source of peat supply, as for example, for the generation of various forms of energy such as electric current.

It is to be understood that the process disclosed herein and the means for carrying it out are illustrative but not restrictive and that the same may be modified within the meaning and scope of the claims which follow.

Having thus described my invention, what I claim as new and desire to secure by Letters Patent, is:

1. The method of treating peat which consists in macerating the freshly dug peat mass, pressing the same into blocks, drying the blocks and then impregnating the blocks with a fuel oil.

2. The method of treating peat which consists in macerating the freshly dug peat mass, compressing the same into blocks, drying the blocks, heating an oil bath and immersing the blocks in the oil bath to impregnate the blocks with the heated oil.

3. Method of treating peat which consists in macerating the peat mass, pressing the mass into peat blocks, drying the blocks, forming apertures therein, and then impregnating the blocks with a fuel oil.

4. The method of treating peat which consists in breaking up the peat mass, compressing the same into blocks, drying the blocks and then soaking the blocks in oil.

5. The method of treating peat which consists in breaking up the peat mass, compressing the same into blocks, drying the blocks slowly in the open air and then soaking the blocks in oil.

6. The method of treating peat which consists in breaking up the peat mass, compressing the same into blocks, drying the blocks first in the sun, continuing the drying of the blocks at atmospheric temperature and then soaking the blocks in oil.

In testimony whereof I have signed my name to this specification.

WESLEY W. BLAIR.